United States Patent
Chen et al.

(10) Patent No.: US 11,614,249 B2
(45) Date of Patent: Mar. 28, 2023

(54) REFRIGERANT LEAK DETECTION METHOD AND DEVICE FOR AIR CONDITIONER

(71) Applicants: GREE ELECTRIC APPLIANCES (WUHAN) CO., LTD, Hubei (CN); GREE ELECTRIC APPLIANCES, INC. OF ZHUHAI, Guangdong (CN)

(72) Inventors: Chong Chen, Guangdong (CN); Hui Huang, Guangdong (CN); Dechao Song, Guangdong (CN); Tao Tian, Guangdong (CN); Bailan Liu, Guangdong (CN)

(73) Assignees: GREE ELECTRIC APPLIANCES (WUHAN) CO., LTD, Hubei (CN); GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 443 days.

(21) Appl. No.: 16/633,580

(22) PCT Filed: Jun. 13, 2018

(86) PCT No.: PCT/CN2018/091070
§ 371 (c)(1),
(2) Date: Jan. 23, 2020

(87) PCT Pub. No.: WO2019/052241
PCT Pub. Date: Mar. 21, 2019

(65) Prior Publication Data
US 2020/0208861 A1  Jul. 2, 2020

(30) Foreign Application Priority Data
Sep. 15, 2017 (CN) .......................... 201710839637.3

(51) Int. Cl.
*F24F 11/36* (2018.01)
*F24F 11/63* (2018.01)
*F24F 11/58* (2018.01)
*G06N 3/04* (2023.01)
*G06N 3/08* (2023.01)

(52) U.S. Cl.
CPC .............. *F24F 11/36* (2018.01); *F24F 11/58* (2018.01); *F24F 11/63* (2018.01); *G06N 3/0454* (2013.01); *G06N 3/08* (2013.01)

(58) Field of Classification Search
CPC .. F24F 11/36; F24F 11/58; F24F 11/63; G06F 17/145; G06N 3/0454; G06N 3/08
See application file for complete search history.

(56) References Cited

U.S. PATENT DOCUMENTS 6,701,722 B1 * 3/2004 Seo ................... F25B 13/00
62/77
2006/0059925 A1 * 3/2006 Horan ................ B60H 1/00585
62/208

(Continued)

FOREIGN PATENT DOCUMENTS

CN  105372087 A  3/2016
CN  105928156 A  9/2016

OTHER PUBLICATIONS

Extended European Search Report for EP 18856758.0 dated Jun. 15, 2020 (9 pages).

(Continued)

*Primary Examiner* — Kidest Bahta
(74) *Attorney, Agent, or Firm* — J. Miguel Hernandez; James R. Gourley; Carstens, Allen & Gourley, LLP (57) ABSTRACT

Disclosed by the present disclosure is a refrigerant leak detection method and device for an air conditioner. The method includes: acquiring current operating parameters of an air conditioner and environment information of a surrounding environment of the air conditioner; inputting the (Continued)

current operating parameters and the environment information into a trained neural network model to obtain an amount of remaining refrigerant outputted by the neural network model; and determining, according to the amount of the remaining refrigerant, whether there is a refrigerant leak in the air conditioner. The present disclosure improves accuracy of detecting a refrigerant leak in the air conditioner by means of an artificial neural network algorithm.

10 Claims, 6 Drawing Sheets

(56) References Cited

U.S. PATENT DOCUMENTS

| | | | |
|---|---|---|---|
| 2011/0112814 A1* | 5/2011 | Clark | G01M 3/3227 73/40 |
| 2016/0265826 A1* | 9/2016 | Liu | F25B 49/005 |
| 2017/0355246 A1* | 12/2017 | Mathe | B60H 1/00985 |

OTHER PUBLICATIONS

Tassou, S.A., et al., "Fault diagnosis and refrigerant leak detection in vapour compression refrigeration systems," International J. of Refrigeration, Elsevier, Amsterdam, NL, vol. 28, No. 5, Aug. 1, 2005, pp. 680-688, XP027765716 (9 pages).

* cited by examiner

REFRIGERANT LEAK DETECTION METHOD AND DEVICE FOR AIR CONDITIONER

CROSS-REFERENCE TO RELATED APPLICATION

This application is a U.S. National Stage of International Application No. PCT/CN2018/091070, filed on Jun. 13, 2018, which claims priority to Chinese Patent Application No. 201710839637.3, filed with the Chinese Patent Office on Sep. 15, 2017, the contents of which are hereby incorporated by reference in their entireties.

TECHNICAL FIELD

The present application relates to the field of artificial intelligence, and in particular to a refrigerant leak detection method and a refrigerant leak detection device for an air conditioner.

BACKGROUND

Long-time operation of the air conditioner in the case of refrigerant leak without timely repair will result in irreversible damages to the compressor. Therefore, if the refrigerant leaks during the operation of the air conditioner, the compressor should be stopped immediately, and a user is reminded of reporting repair.

At present, the refrigerant leak detection method in the air conditioner industry is mainly as flows: the operating parameters of the air conditioner in the case of refrigerant leak are analyzed, and a series of control rules based on experts' experience are summarized; the main board of the air conditioner determines based on these rules; when it is detected that the operating parameters of the air conditioner conform to a predetermined rule, it is determined that there is a refrigerant leak in the air conditioner, and the user is reminded of reporting the repair. However, due to a wide variety of air conditioners, the operating parameters of different types of air conditioners are quite different, and the coupling relationships and change rules between various operating parameters are difficult to grasp completely, moreover, the experts' experience is somewhat subjective. Therefore, the current control method has the following problems:

1. The control rules are poorly adaptive, and the control parameters of different types of air conditioners are not unified;

2. The accuracy of detecting the refrigerant leak is low, and there are more false detections.

In view of the problem of the inaccurate determination of refrigerant leak in the air conditioner based on artificial experience in the related technology, no effective solutions have been proposed yet.

SUMMARY

The main objective of the present application is to provide a refrigerant leak detecting method and a refrigerant leak detecting device for an air conditioner, to solve the problem of inaccurate judgment about whether there is a refrigerant leak in the air conditioner based on artificial experience.

In order to achieve the above objective, according to one aspect of the present application, a refrigerant leak detection method for an air conditioner is provided. The method includes acquiring current operating parameters of the air conditioner and environment information of a surrounding environment of the air conditioner; inputting the current operating parameters and the environment information into a trained neural network model, to obtain an amount of remaining refrigerant output from the neural network model; and determining whether there is a refrigerant leak in the air conditioner according to the amount of the remaining refrigerant.

Further, before the inputting the operating parameters and the environment information into the trained neural network model, the method further comprises: acquiring an operating parameters and environment information of each type of air conditioner in a case of a refrigerant leak; training a neural network model according to the operating parameters and the environment information of each type of air conditioner in the case of the refrigerant leak, to obtain a trained neural network model; wherein inputs of the model are the operating parameters and the environmental information of the air conditioner in the case of the refrigerant leak, and an output of the model is the amount of the remaining refrigerant.

Further, after the acquiring the operating parameters and the environment information of each type of air conditioner in the case of the refrigerant leak, the method further includes: performing a normalization processing on the operating parameters and the environment information of each type of air conditioner in the case of the refrigerant leak, to obtain normalized parameters, wherein the normalization processing includes a linear processing; and performing a transformation processing on the normalized parameters to obtain transformed data, wherein the transformation processing includes a non-linear processing.

Further, after the performing the transformation processing on the normalized parameters to obtain the transformed data, the method further includes: categorizing the transformed data to obtain multiple categories of data; extracting data respectively from the multiple categories of data at a preset interval to serve as training sample data, wherein the preset interval includes a preset time interval or a preset number interval; and training the neural network model by the training sample data, to obtain the trained neural network model.

Further, after the training the neural network model by the training sample data to obtain the trained neural network model, the method further includes: inputting testing data into the trained neural network model to obtain an output result of the trained neural network model; determining whether an error between the output result and a tested result corresponding to the testing data is less than a minimum target error; if the error between the output result and the tested result corresponding to the testing data is greater than or equal to the minimum target error, adjusting parameters of the neural network model through updating weights and offsets of the neural network model, till the error between the output result and the tested result corresponding to the testing data is less than the minimum target error.

Further, the acquiring the operating parameters and the environment information of each type of air conditioner in the case of the refrigerant leak includes: receiving the operating parameters and the environment information reported by each type of air conditioner in the case of the refrigerant leak; and acquiring, by Internet of things, the operating parameters and the environment information of each type of air conditioner in the case of the refrigerant leak when the air conditioner is actually used by a user.

Further, the acquiring the operating parameters and the environment information of each type of air conditioner in the case of the refrigerant leak includes: receiving the operating parameters and the environment information reported by each type of air conditioner in the case of the refrigerant leak; or acquiring, by Internet of things, the operating parameters and the environment information of each type of air conditioner in the case of the refrigerant leak when the air conditioner is actually used by a user.

Further, the inputs of the neural network model include indoor and outdoor environment temperatures, an outdoor condenser temperature, outdoor humidity, an operating speed of a compressor of the air conditioner, and operating time of the compressor.

Further, the determining whether there is a refrigerant leak in the air conditioner according to the amount of the remaining refrigerant includes: acquiring an amount of original refrigerant of the air conditioner; determining whether the amount of the remaining refrigerant is less than the amount of the original refrigerant; if the amount of the remaining refrigerant is less than the amount of the original refrigerant, determining that there is a refrigerant leak in the air conditioner.

Further, the neural network model includes any one of following models: a BP neural network model, a Convolutional Neural Network (CNN) model, and a residual neural network model; after it is determined that there is a refrigerant leak in the air conditioner according to the amount of the remaining refrigerant, a warning is sent out through a preset mode.

In order to achieve the above objective, according to another aspect of the present application, a refrigerant leak detection device for an air conditioner is provides, and the device includes: a first acquirement unit, configured to acquire a current operating parameters of the air conditioner and environment information of a surrounding environment of the air conditioner; an input unit, configured to input the current operating parameters and the environment information into a trained neural network model, to obtain an amount of remaining refrigerant output from the neural network model; and a determination unit, configured to determine whether there is a refrigerant leak in the air conditioner according to the amount of the remaining refrigerant.

Further, the device further includes: a second acquirement unit configured to, before the operating parameters and the environment information are input into the trained neural network model, acquire operating parameters and environment information of each type of air conditioner in the case of a refrigerant leak; and a first train unit, configured to train a neural network model according to the operating parameters and the environment information of each type of air conditioner in the case of the refrigerant leak to obtain the trained neural network model, wherein, inputs of the model are the operating parameters and the environmental information of the air conditioner in the case of the refrigerant leak, and an output of the model is the amount of the remaining refrigerant.

Further, the device further includes: a procession unit configured to, after the operating parameters and the environment information of each type of air conditioner in the case of refrigerant leak are acquired, perform a normalization processing on the operating parameters and the environment information of each type of air conditioner in the case of the refrigerant leak, to obtain normalized parameters, wherein the normalization processing includes a linear processing; and a transformation unit, configured to perform a transformation processing on the normalized parameters to obtain transformed data, wherein the transformation processing includes a non-linear processing.

Further, the device further includes: a category unit configured to, after the normalized parameters are transformed to obtain the transformed data, categorize the transformed data to obtain multiple categories of data; an extracting unit, configured to extract data respectively from the multiple categories of data at a preset interval, to serve as training sample data, wherein the preset interval includes a preset time interval or a preset number interval; and a second train unit, configured to train the neural network model by the training sample data to obtain the trained neural network model.

In order to achieve the above objective, according to another aspect of the present application, a storage medium is provided and includes programs stored thereon. The programs, when executed, control a device having the storage medium to perform the refrigerant leak detection method for the air conditioner of the present application.

In order to achieve the above objective, according to another aspect of the present application, a processor is provided and configured to, when executed, perform the refrigerant leak detection method for the air conditioner of the present application.

In the present application, the current operation parameters of the air conditioner and the environment information of the surrounding environment of the air conditioner are acquired and adopted; the current operation parameters and the environment information are input to the trained neural network model, to obtain the remaining refrigerant amount output from the neural network model; and judge whether there is a refrigerant leak in the air conditioner according to the remaining refrigerant amount. The method solves the problem of inaccurate judgment about whether there is a refrigerant leak in the air conditioner based on artificial experience, thereby achieving the effect of improving the accuracy of detecting the refrigerant leak in the air conditioner by means of the artificial neural network algorithm.

BRIEF DESCRIPTION OF THE DRAWINGS

The accompanying drawings attached to the specification form a part of the disclosure and are intended to provide a further understanding of the present disclosure. The illustrative embodiments of the present disclosure and the description thereof are used for explanations of the present disclosure, but are not intended to limit the present disclosure. In the accompanying drawings.

DETAILED DESCRIPTION OF THE EMBODIMENTS

It should be noted that the embodiments in the present disclosure and the features in the embodiments can be combined with each other if no conflicts occur. The present disclosure will be described in detail below with reference to the accompanying drawings in combination with the embodiments.

In order to make those skilled in the art better understand the technical solutions of the present disclosure, the technical solutions in the embodiments of the present disclosure will be clearly and completely described hereafter with reference to the accompanying drawings in the embodiments of the present disclosure. Apparently, the embodiments described herein are merely some embodiments, but not all embodiments of the present disclosure. Based on the embodiments of the present disclosure, all other embodiments obtained by a person of ordinary skill in the art without creative efforts also fall within the protection scope of the present disclosure.

It should be noted that the terms "first", "second", and the like in the description, claims and drawings of the present disclosure are used for distinguishing similar objects, and are not definitely used for describing a specific order or a precedence order. It should be appreciated that such terms can be interchangeable if appropriate, so as to facilitate the description of the embodiments of the disclosure. In addition, the terms "comprise", "have" and any deformations thereof are intended to cover a non-exclusive inclusion, for example, a process, a method, a system, a product, or an device that includes a series of steps or units is not definitely limited to explicitly list those steps or units, but can include other steps or units that are not explicitly listed or inherent to such a process, a method, a product or a device.

An embodiment of the present disclosure provides a refrigerant leak detection method for an air conditioner.

Figure 1:
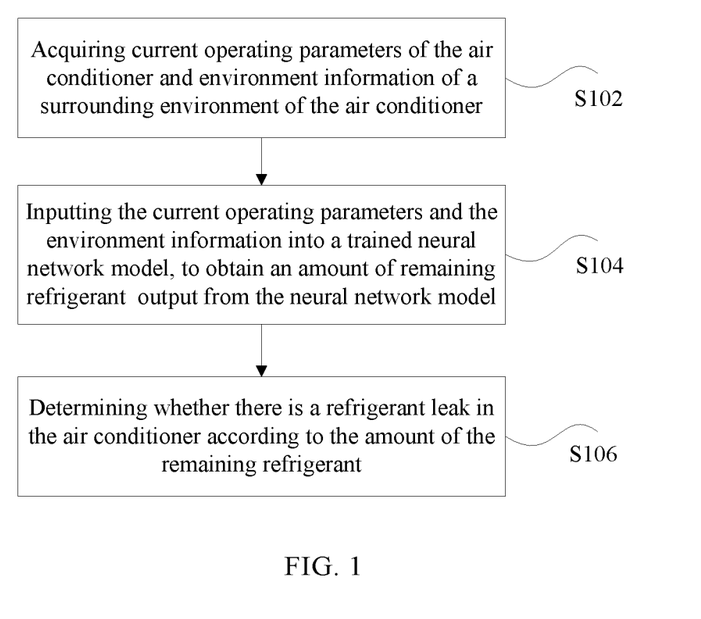
FIG. 1 is a flow chart of a refrigerant leak detection method for an air conditioner according to an embodiment of the present disclosure.

FIG. 1 is a flow chart of a refrigerant leak detection method for an air conditioner according to an embodiment of the present disclosure. As shown in FIG. 1, the method includes the following steps.

In a step S102, current operating parameters of an air conditioner and environment information of a surrounding environment of the air conditioner are acquired.

In a step S104, the current operating parameters and the environment information are input into a trained neural network model, to obtain an amount of remaining refrigerant output from the neural network model.

In a step S106, it is determined whether there is a refrigerant leak in the air conditioner according to the amount of the remaining refrigerant.

In the present embodiment, the current operating parameters of the air conditioner and the environment information of the surrounding environment of the air conditioner are acquired and adopted; the current operation parameters and the environment information are input into the trained neural network model to obtain the amount of the remaining refrigerant output from the neural network model; and judge whether there is a refrigerant leak in the air conditioner according to the amount of the remaining refrigerant. The method solves the problem of inaccurate determination of a refrigerant leak in the air conditioner based on artificial experience, thereby achieving the effect of improving the accuracy of detecting the refrigerant leak in the air conditioner by means of the artificial neural network algorithm.

In the embodiment of the present disclosure, the current operating parameters of the air conditioner include various types of parameters, such as an operating speed of the compressor of the air conditioner, operating time of the compressor, and a temperature of the outdoor condenser, etc. The environment information includes an indoor environment temperature and an outdoor environment temperature. The current operating parameters and the environment information are input into the trained neural network model, obtaining the amount of the remaining refrigerant determined by the model; then it is determined whether there is a refrigerant leak based on the amount of the remaining refrigerant and the amount of the original refrigerant of the air conditioner; and if there is a refrigerant leak, the air conditioner can issue a warning, or a preset smart terminal device can issue a warning and controls the air conditioner to perform a predetermined operation to prevent or reduce the refrigerant leak in the air conditioner.

Optionally, before inputting the operating parameters and the environment information into the trained neural network model, the operating parameters and the environment information of each type of air conditioner in the case of refrigerant leak are acquired; the neural network model is trained according to the operating parameters of each type of air conditioner in the case of refrigerant leak, to obtain a trained neural network model. The inputs of the model are the operating parameters and the environment information of the air conditioner in the case of refrigerant leak, and the output of the model is the amount of the remaining refrigerant. Because the types of air conditioners with different models are different, the operating parameters and the environment information of each type of air conditioner in the case of refrigerant leak can be acquired respectively according to the type of air conditioner, and then data of the operating parameters and the environment information of each type of air conditioner are processed respectively to obtain a trained neural network model of each type of air conditioner.

Optionally, after acquiring the operating parameters and the environment information of each type of air conditioner in the case of refrigerant leak, perform a normalization processing on the operating parameters and the environment information of each type of air conditioner in the case of refrigerant leak, to obtain normalized parameters, where the normalization processing includes a linear processing; performing a transformation processing on the normalized parameters to obtain transformed data, where the transformation processing includes a non-linear processing.

The linear processing can be a normalization processing, etc.; and the non-linear processing can be a logarithmic transformation, a square root transformation, and a cubic root transformation, etc. The normalization processing and the transformation processing can make the collected sample data better meet the requirements of model training, and can also make the results obtained by model training more accurate.

Optionally, after the transforming the normalized parameters to obtain transformed data, the transformed data is categorized to obtain data of multiple categories; some data are extracted respectively from the data of multiple categories at a preset interval, to serve as training sample data, where the preset interval includes a preset time interval or a preset number interval; the neural network model is trained by the training sample data, to obtain a trained neural network model.

Apart from data processing, the data can also be categorized, and then a certain number of data are selected from each category, to serve as sample data. The selection mode can be a mode that data are selected from every 50 data to serve as sample data, or that data are selected at a regular time interval, such as 24 hours, to serve as sample data, or that data are selected at intervals of other modes.

Optionally, after the training the neural network model by the training sample data to obtain the trained neural network model, input the testing data into the trained neural network model, to obtain an output result of the trained neural network model; it is determined whether an error between the output result and the tested result corresponding to the testing data is less than a minimum target error; if the error between the output result and the tested result corresponding to the testing data is greater than or equal to the minimum target error, the parameters of the neural network model are adjusted through updating weights and offsets of the neural network model, till the error between the output result and the tested result corresponding to the testing data is less than the minimum target error.

If the difference between the recognized result of the trained neural network model and the actual result is larger, the parameters of the neural network model can be adjusted through increasing the number of sample data or updating the weights and the offsets of the neural network model, till the error between the output result and the tested result corresponding to the testing data is less than the minimum target error. In this case, it means that the model has been trained and can be applied to perform a practical prediction.

Optionally, the step of acquiring the operating parameters and the environment information of each type of air conditioner in the case of refrigerant leak includes: receiving the reported operating parameters and the environment information of each type of air conditioner in the case of refrigerant; and/or acquiring, by Internet of Things, the operating parameters and the environment information of each type of air conditioner in the case of refrigerant leak when the air conditioner are actually used by a user The sources of the operating parameters of the air conditioner can be various.

Optionally, the step of determining whether there is a refrigerant leak in the air conditioner according to the amount of the remaining refrigerant includes: acquiring an amount of original refrigerant of the air conditioner; determining whether the amount of the remaining refrigerant is less than the amount of the original refrigerant; if the amount of the remaining refrigerant is less than the amount of the original refrigerant, determining that there is a refrigerant leak in the air conditioner. The amount of the original refrigerant can be the amount of the refrigerant that the air conditioner has when the air conditioner leaves the factory or is turned on each time.

Optionally, the neural network model includes any one of the following models: a BP neural network model, a Convolutional Neural Network (CNN) model and a residual neural network model. After it is determined that there is a refrigerant leak in the air conditioner according to the amount of the remaining refrigerant, a warning is issued by a preset manner. The preset manner can have multiple forms, such as the air conditioner emits a sound alarm or displays an alarm light; or a mobile phone, a remote controller, or an intelligent control center at home issues a sound alarm, to warn the user of checking and maintaining the air conditioner in time. Apart from three types of neural network models illustrated herein, other types of neural network models can also be used.

In the present disclosure, a preferred embodiment is further provided. The technical solution of the embodiment of the present disclosure will be described below in conjunction with the preferred embodiment.

In the embodiment of the present disclosure, the artificial neural network algorithm is applied in learning and training the neural network model by using a large number of sample operating parameters of the air conditioner in the case of refrigerant leak. By adjusting the network structure and the weights between network nodes, the neural network fits the relationship between the operating parameters of the air conditioner, thereby finally enabling the neural network to detect the leakage of the refrigerant accurately.

The present method has strong nonlinear mapping ability, self-learning and self-adaptive ability, generalization ability, and fault-tolerant ability. Compared with a traditional control method based on rules, the method of the present disclosure does not depend on the experts' experience. Through learning with a large number of sample data, the network can automatically and continuously revise its own parameters, and finally achieves the following effects:

1. The control algorithm can be automatically adaptive to different types of air conditioners and has good universality;
2. With the increase in the number of the sample data for learning, the detection accuracy rate of the control algorithm can infinitely approach 100%.

Specifically, the technical solution of the present disclosure includes the following steps.

1. Collecting Original Data

First, the operating parameters of the air conditioner in all possible operating environments in the case of refrigerant leak are collected and labeled in detail. Specific collecting modes include, but are not limited to, collecting the operating parameters of the air conditioners in a laboratory simulation environment, and collecting the operating parameters of the air conditioner through Internet of Things, etc. when the user actually uses the air conditioner.

2. Selecting and Preprocessing Input Parameters and an Output Parameter

By analyzing the original data and combining experts' knowledge, the parameters, which have greater impacts on the detection of refrigerant leak and are easy to detect are selected to be the input parameters, and the amount of the remaining refrigerant is selected to be the output amount. In the embodiment of the present disclosure, the input parameters include, but are not limited to, indoor and outdoor environment temperatures, an outdoor condenser temperature, outdoor humidity, an operating speed of the compressor, and operating time of the compressor. The input parameters are not limited to a single parameter, but can also include an input parameter matrix formed according to a certain rule. For example, the outdoor condenser temperature collected per second, and the temperature parameters continuously collected within 10 minutes form an input parameter matrix.

Because different parameters have different physical meanings and dimensions, the input parameters also need to be normalized first and then uniformly transformed. The data processing methods used in the embodiments of the present disclosure include, but are not limited to, a linear processing such as normalizing the data, and a non-linear processing such as logarithmic transformation, square root transformation, or cubic root transformation.

3. Selecting Training and Testing Data Samples

By analyzing the collected and labeled data and combining the experts' knowledge, the data samples are categorized according to certain rules. Data are uniformly extracted from different types of samples to serve as training samples. The training samples not only contain a law of occurrences of the refrigerant leak, but also reflect diversity and uniformity. In the embodiment of the present disclosure, all sample data are combined and listed according to the indoor and outdoor environment temperatures of the air conditioner and the outdoor humidity, and then some data are read at regular time intervals to serve as training sample data; after the training samples are extracted, the remaining data can serve as testing data.

4. Designing a Network Structure

Figure 2:
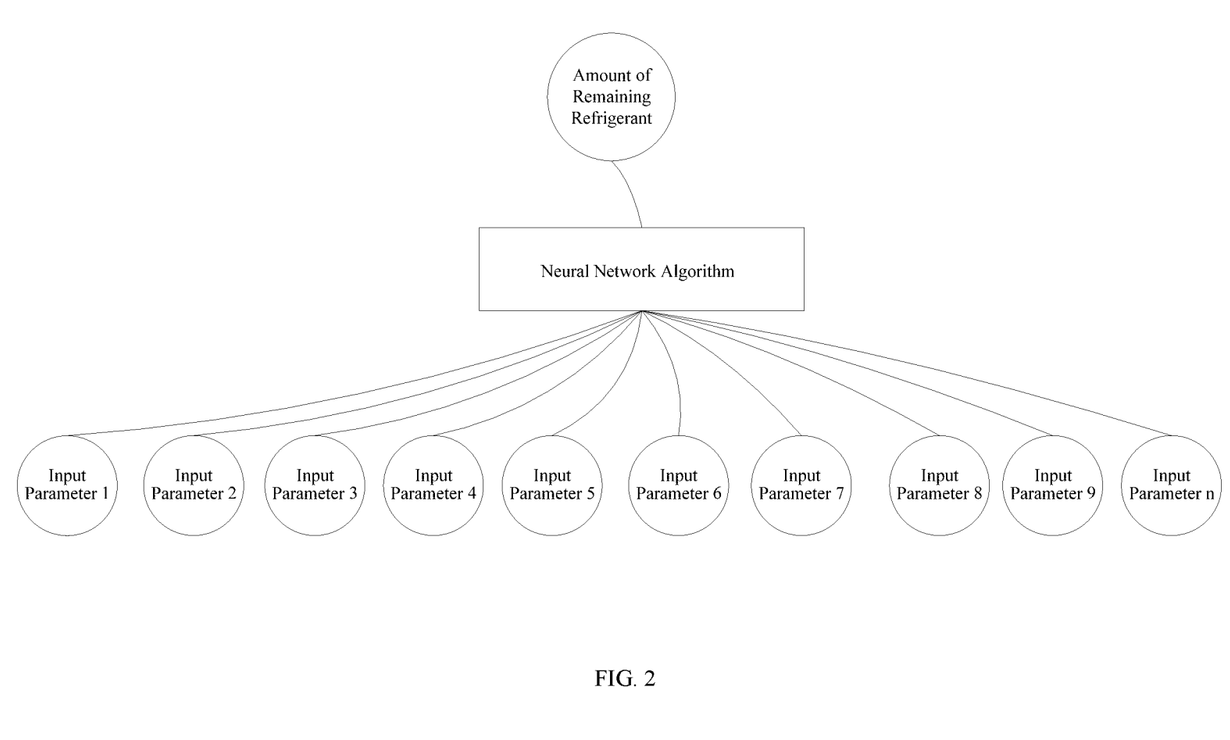
FIG. 2 is a schematic diagram showing a computation performed according to a neural network algorithm of an embodiment of the present application.

According to the characteristics of the data of the refrigerant leak and the law contained in the data, initially determine the basic network structure, the number of input nodes and output nodes of the network, the number of hidden layers of the network, the number of hidden nodes, the initial weights of the network, etc. FIG. 2 is a schematic diagram showing a computation performed according to a neural network algorithm of an embodiment of the present disclosure. As shown in FIG. 2, pluralities of input parameters are input into the neural network algorithm to obtain the amount of the remaining refrigerant. Specifically, the artificial neural network structures include, but are not limited to, the following three network structures.

4.1 BP Neural Network

Figure 3:
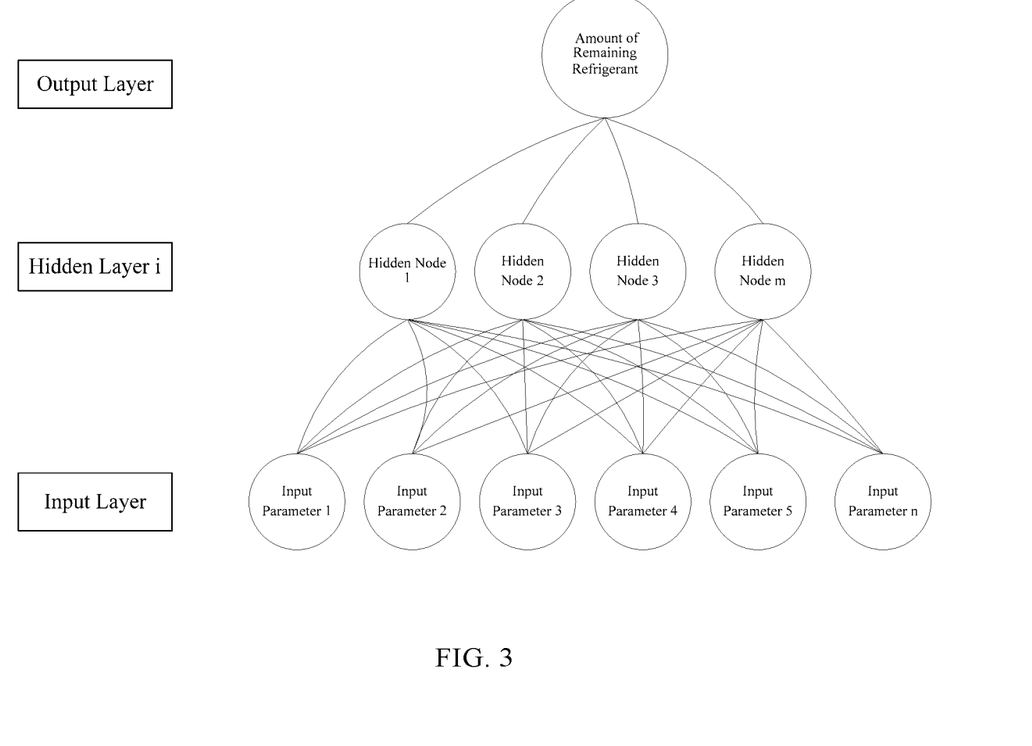
FIG. 3 is a structural schematic diagram of a BP network according to an embodiment of the present disclosure.

FIG. 3 is a structural schematic diagram of a BP network according to an embodiment of the present disclosure. As shown in FIG. 3, the neural network algorithm mainly needs to solve the problem of designing how many hidden layers and hidden nodes. After being continuously adjusted during training the network, the number of the hidden layers and the hidden nodes are determined. During the design, at first, one hidden layer is provided, and the performance of the network is improved by adjusting the number of the hidden nodes; when too many hidden nodes are provided, and excessive fitting occurs, it is considered to add the hidden layers and reduce the hidden nodes in order to improve the performance of the network. In practical applications, the number of the nodes in the input layer, in the hidden layers and in the output layer, and the number of the hidden layers can be adjusted as required.

4.2 Convolutional Neural Network (CNN)

Figure 4:
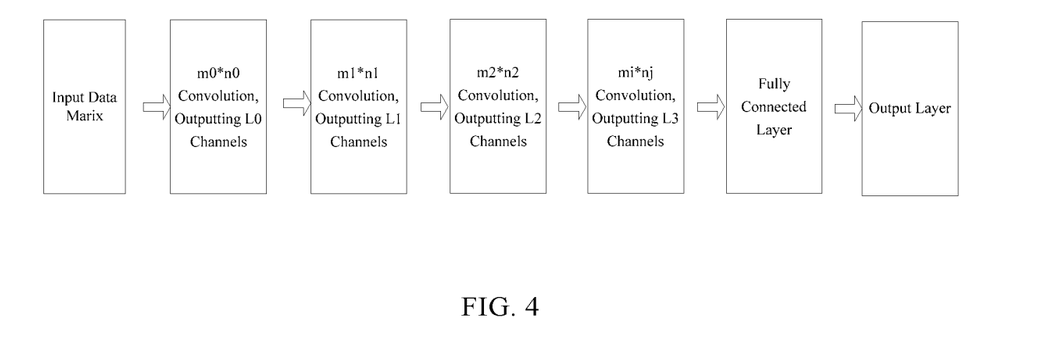
FIG. 4 is a structural schematic diagram of a Convolutional Neural Network (CNN) according to an embodiment of the present disclosure.

FIG. 4 is a structural schematic diagram of a convolutional neural network (CNN) according to an embodiment of the present disclosure. As shown in FIG. 4, the multi-layered convolutional network continuously extracts and combines lower-dimensional features to obtain higher-dimensional features, so as to perform classification or related tasks.

The original data in the embodiment of the present application are collected continuously and are intuitively time-related. A certain number of data can be combined one by one, forming a data format of an image. In such a data format, there are spatial continuous correlations between rows and between columns, and these correlations affect the "label" of the final data, that is, the amount of remaining refrigerant. In this way, features can be extracted from the input data by the convolutional neural network, to accurately detect the remaining refrigerant amount. In a practical application, the network structure can be adjusted according to the actual situations.

4.3 Residual Neural Network

Figure 5:
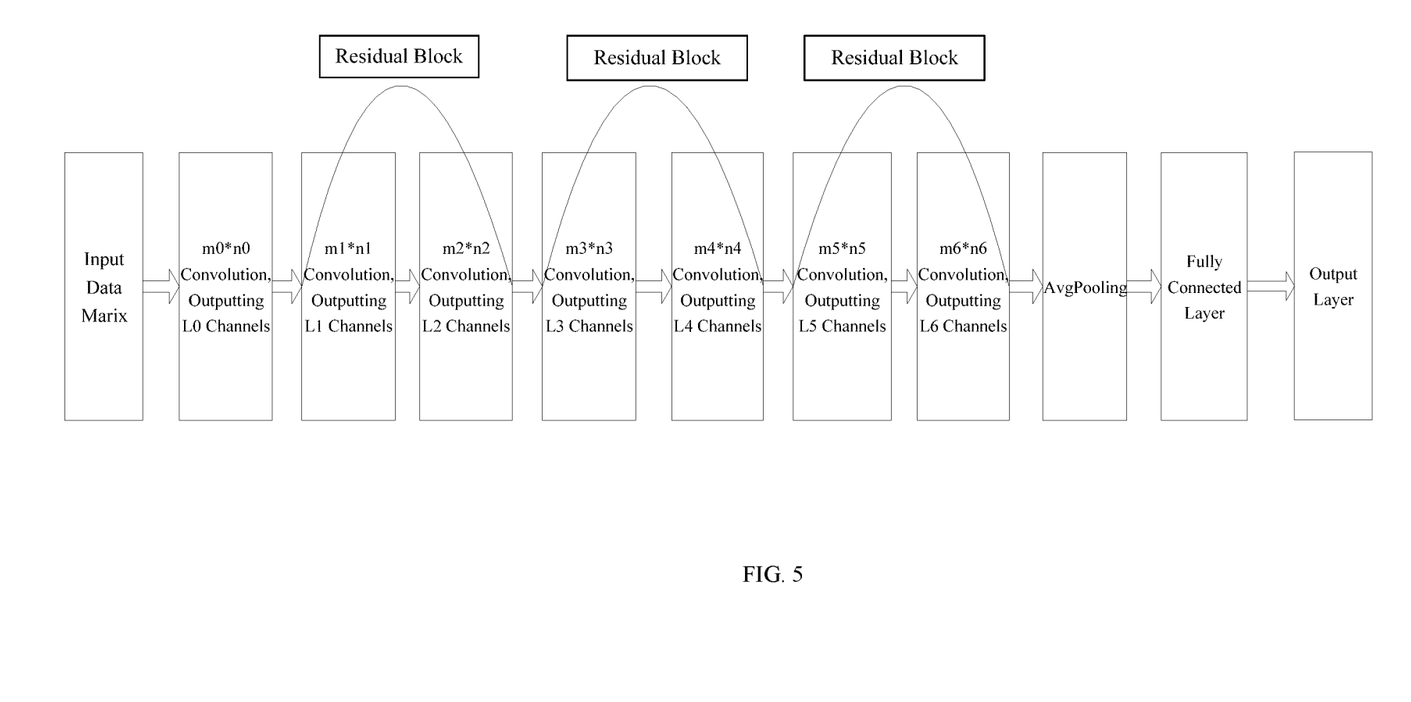
FIG. 5 is a structural schematic diagram of a residual neural network according to an embodiment of the disclosure.
Figure 6:
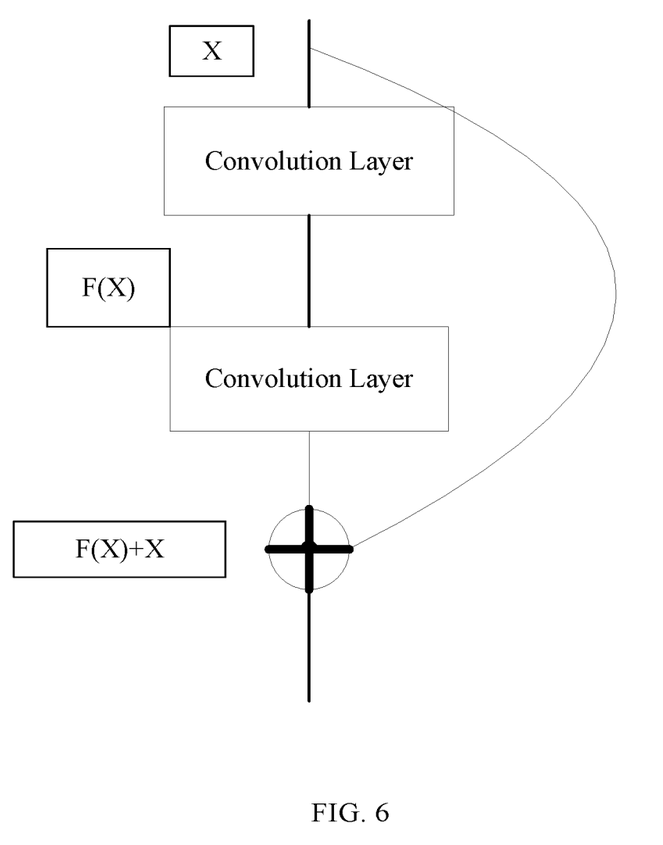
FIG. 6 is a schematic diagram illustrating a neural network learning target according to an embodiment of the present disclosure.

FIG. 5 is a structural schematic diagram of a residual neural network according to an embodiment of the present disclosure. As shown in FIG. 5, when adjusting and testing a CNN network, the method of increasing the number of network layers and changing the size of the convolution kernel cannot make the performance of the network improved. Addition of a residual block can make the data before and after the residual block connected better, to strengthen representation ability of features, so the addition of the residual block can strengthen the learning ability of the convolution network. FIG. 6 is a schematic diagram illustrating a neural network learning target according to an embodiment of the present disclosure. As shown in FIG. 6, the input of the neural network is x, and the expected output is H (x). If an initial structure is the one that the input x is transmitted to the output, the learning target becomes F (x)=H (x)−x. In an actual application, the network structure can be adjusted according to the actual situation.

5. Training and Testing a Network

After the network design is completed, the network needs to be trained by the training sample data. The training method can be adjusted according to the actual network structure and problems found during training. One of the methods in the embodiments of the present disclosure is provided as follows:

import the input data x, and according to an activation function, initial weights and offsets, calculate an actual output a (x) of the network, that is, $a(x)=1/(1+e^{-z})$, where $Z=W_k*x+b_l$;

determine whether an expected output y (x) and the actual output a (x) of the network satisfy the accuracy requirement of output, that is, determine whether $\|y(x)-a(x)\|<\in$ is satisfied, where $\in$ is a minimum target error;

if the accuracy requirement is satisfied, then the network training ends; if the accuracy requirements are not satisfied, update the weight $w_k$ of the network and the offset $b_l$ according to the following methods:

C (w,b) is an error energy function (taking a standard variance function as an example), n is the total number of the training samples, and the summation is performed on the total training samples x, $$C(w, b) \equiv \frac{1}{2n} \sum_x \|y(x) - a\|^2$$

update the weight of each layer:

$$w_k \to w_k' = w_k - \eta \frac{\partial C}{\partial w_k}$$

update the offset of each layer:

$$b_l \to b_l' = b_l - \eta \frac{\partial C}{\partial b_l}$$

where $w_k$ is an initial weight;

$$\frac{\partial C}{\partial w_k}$$

is a partial derivative of the error energy function to the weight; $b_l$ is an initial offset; and $$\frac{\partial C}{\partial b_l}$$

is a partial derivative of the error energy function to the offset; the values of $$\frac{\partial C}{\partial w_k} \text{ and } \frac{\partial C}{\partial b_l}$$

can be obtained by chain-type derivation rule till the error of the output of the network is less than $\in$.

After the network is trained, the network is tested forward by employing the testing samples. When the tested error does not satisfy the requirements, the above steps are repeated to train the network again; if the tested error satisfies the requirements, the network training and the testing end.

Figure 7:
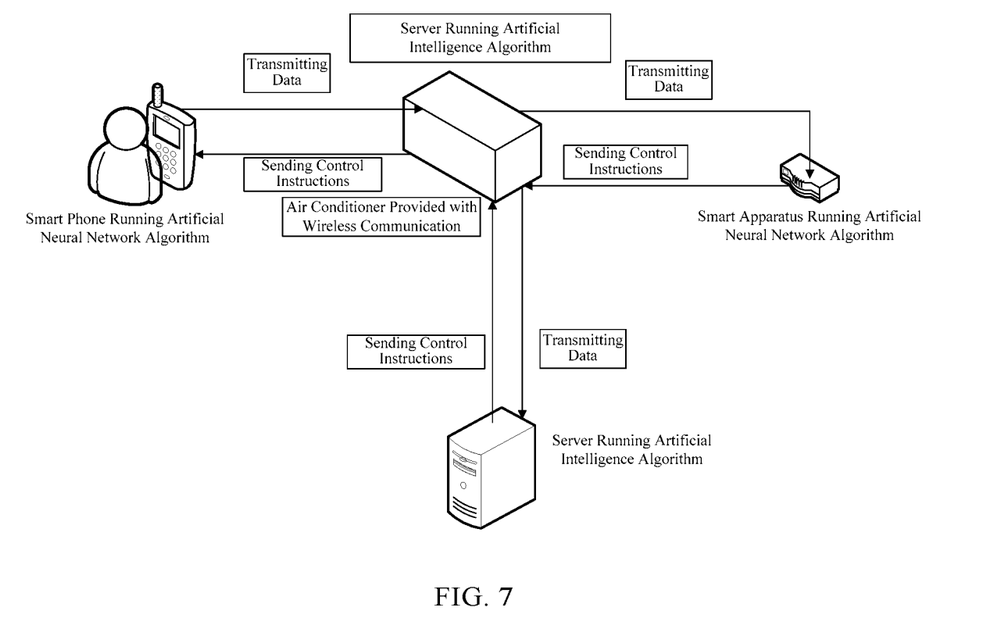
FIG. 7 is a schematic diagram illustrating an intelligent device running an artificial neural network algorithm according to an embodiment of the present disclosure.

6. Implementing Refrigerant Leak Detection by Artificial Neural Network Algorithm FIG. 7 is a schematic diagram illustrating an intelligent device running an artificial neural network algorithm according to an embodiment of the present disclosure. As shown in FIG. 7, when an air conditioner provided with wireless communication is operating, the operating parameters of the air conditioner are uploaded to an intelligent device. The intelligent device inputs the operating parameters into the algorithm, and after determining the condition of the refrigerant leak, send control instructions to the air conditioner. In the embodiment of the present disclosure, the intelligent device includes, but is not limited to, a wireless communication module, a router, a server, and a smart phone.

It should be noted that the steps shown in figures can be performed in a computer system of a group of computers which can execute instructions. Though logical sequences are shown in the flow charts, in certain cases, the steps shown or described can be performed in sequences different from the sequences shown herein.

The embodiment of the present disclosure provides a refrigerant leak detection device for an air conditioner, and the device can be applied to execute the refrigerant leak detection method of the embodiment of the present disclosure.

Figure 8:
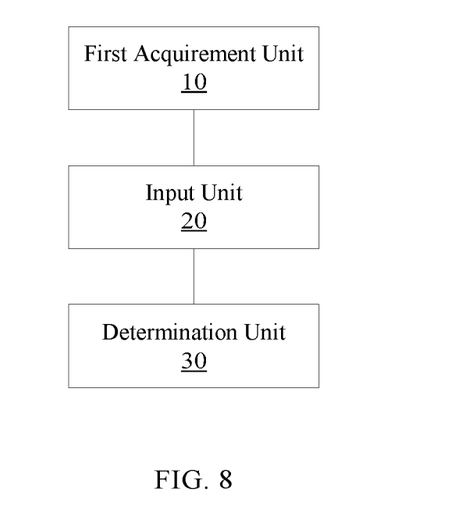
FIG. 8 is a schematic diagram illustrating a refrigerant leak detection device for an air conditioner according to an embodiment of the present disclosure.

FIG. 8 is a schematic diagram illustrating a refrigerant leak detection device for an air conditioner according to an embodiment of the present disclosure. As shown in FIG. 8, the device includes:

a first acquirement unit 10, configured to acquire current operation parameters of the air conditioner and environment information of a surrounding environment of the air conditioner;

an input unit 20, configured to input the current operation parameters and the environment information into a trained neural network model, to obtain an amount of the remaining refrigerant output from the neural network model; and a determination unit 30, configured to determine whether there is a refrigerant leak in the air conditioner according to the amount of the remaining refrigerant.

In the present embodiment, the first acquirement unit 10 acquires the current operation parameters of the air conditioner and the environment information of the surrounding environment of the air conditioner; the input unit 20 inputs the current operation parameters and the environment information into the trained neural network model, to obtain the amount of the remaining refrigerant output from the neural network model; the determination unit 30 determines whether there is a refrigerant leak in the air conditioner according to the amount of the remaining refrigerant. The device solves the problem of inaccurate determination of whether there is a refrigerant leak in the air conditioner based on the artificial experience, thereby achieving the effect of improving the accuracy of detecting the refrigerant leak in the air conditioner by means of the artificial neural network algorithm.

Optionally, the device further includes: a second acquirement unit configured to, before the operation parameters and the environment information are input into the trained neural network model, acquire the operating parameters and the environment information of each type of air conditioner in the case of refrigerant leak; and a first train unit, configured to train the neural network model according to the operating parameters of each type of air conditioner in the case of refrigerant leak, to obtain a trained neural network model. Where the input of the model is the operating parameters and the environmental information of the air conditioner in the case of refrigerant leak, and the output of the model is the amount of the remaining refrigerant.

Optionally, the device further includes: a procession unit configured to, after the operating parameters and the environment information of each type of air conditioner in the case of refrigerant leak are acquired, normalize the operating parameters and the environment information of each type of air conditioner in the case of refrigerant leak to obtain normalized parameters, where the normalization processing includes a linear processing; and a transformation unit, configured to transform the normalized parameters to obtain transformed data, where the transformation processing includes a non-linear processing.

Optionally, the device further includes: a category unit configured to, after the normalized parameters are transformed to obtain the transformed data, category the transformed data to obtain data of multiple categories; an extracting unit, configured to extract some data respectively from the data of multiple categories at a preset interval to serve as training sample data, where the preset interval includes a preset time interval or a preset number interval; and a second train unit, configured to train the neural network model by the training sample data to obtain a trained neural network model.

It should be noted that the first acquirement unit 10, the input unit 20 and the determination unit 30, as a part of the device, can operate in a computer terminal, and functions achieved by these modules can be performed by a processor in the computer terminal. The computer terminal can also be a terminal device such as a smart phone (e.g. an Android phone, an iOS phone, etc.), a tablet computer, a handheld computer, a Mobile Internet Device (MID), or a PAD.

The refrigerant leak detection device for an air conditioner includes a processor and a memory. The first acquirement unit, the input unit, and the determination unit, etc. are stored in the memory as program units, and the program units stored in the memory, when executed by the processor, achieve the corresponding functions.

The processor includes a core, and the core calls the corresponding program units stored in the memory. One or more cores are provided. The refrigerant leak in the air conditioner is detected by adjusting the parameters of the core through the artificial neural network algorithm, to improve the accuracy.

The memory can include a volatile memory of computer readable storage medium, random access memory (RAM), and/or non-volatile memory, such as Read Only Memory (ROM) or flash RAM. The memory includes at least one memory chip.

The embodiment of the present disclosure provides a device. The device includes a processor, a memory, and programs stored on the memory and executable by the processor. When the processor executes the programs, the following steps are implemented: current operating parameters of the air conditioner and the environment information of the surrounding environment of the air conditioner are acquired; the current operation parameters and the environment information are input into a trained neural network model, to obtain the amount of the remaining refrigerant output from the neural network model; it is determined whether there is a refrigerant leak in the air conditioner according to the amount of the remaining refrigerant. The device in this article can be a server, a PC, a PAD, or a mobile phone, etc.

The present disclosure further provides a computer program product, which, when executed in a data processing device, is adaptive to execute a program initialized with the following method steps of: acquiring a current operating parameters and the environment information of the surrounding environment of the air conditioner; inputting the current operating parameters and the environment information into the trained neural network model to obtain the amount of the remaining refrigerant output by the neural network model; and determining whether there is a refrigerant leak in the air conditioner according to the amount of the remaining refrigerant.

It should be understood for those skilled in the art that, the embodiments of the present disclosure can be provided as a method, a system, or a computer program product. Therefore, the present disclosure can be in the form of complete hardware embodiments, complete software embodiments, or embodiments combining hardware and software. Moreover, the present disclosure can be in the form of a computer program product implemented in one or more computer-usable storage media (including, but not limited to, magnetic disk storage, CD-ROM and optical storage, etc.) including computer-usable program codes.

The present disclosure is described referring to the flow charts and/or the block diagrams of the methods, devices (systems) and computer program products according to the embodiments of the present disclosure. It should be understood that, each flow in the flow chart and/or each block in the block diagram, and a combination of a flow in the flow chart and/or a block in the block diagram may be implemented by computer program instructions. Such computer program instructions can be provided in a processor of a general-purpose computer, a processor of a special-purpose computer, a built-in processor or other programmable data processing devices, to produce a machine, so that the instructions executed by the processor of a computer or other programmable data processing devices can produce a device for implementing the functions specified in one or more flows in the flow chart and/or one or more blocks in the block diagram.

Such computer program instructions can also be stored in a computer-readable storage that can guide a computer or other programmable data processing devices to work in a specific mode, so that the instructions stored in the computer-readable storage can produce a manufacture including an instructing device, where the instructing device can implement the functions specified in one or more flows in the flow chart and/or one or more blocks in the block diagram.

Such computer program instructions can also be uploaded to a computer or other programmable data processing devices, so that a series of operational steps can be performed in the computer or other programmable devices, to produce a computer-implemented processing, thereby the instructions executed in the computer or other programmable devices can provide a step for implementing the functions specified in one or more flows in the flow chart and/or one or more blocks in the block diagram.

It should also be noted that the terms "including", "comprising" or any other variants thereof are intended to cover non-exclusive inclusion, so as to make a process, a method, a product or a device, which includes a series of elements, include not only those elements, but also other elements not explicitly listed or those inherent to such a process, a method, a product, or a device. Without more limitations, the element defined by a sentence "including an . . . " does not exclude other identical elements in the process, in the method, in the product, or in the equipment including the element.

It should be understood for those skilled in the art that, the embodiments of the present disclosure can be provided as a method, a system, or a computer program product. Therefore, t the present disclosure can be in the form of complete hardware embodiments, complete software embodiments, or embodiments combining hardware and software. Moreover, the present disclosure can be in the form of a computer program product implemented in one or more computer-usable storage media (including, but not limited to, magnetic disk storage, CD-ROM and optical storage, etc.) including computer-usable program codes available to the computer.

What described above are several embodiments of the present disclosure, and they are not intended to limit the protection scope of the present application. For those skilled in the prior art, that various modifications and changes can be made. Any modifications and changes made without departing from the sprits and the principles of the present disclosure should be within the scope of the claims of the present disclosure.

INDUSTRIAL PRACTICAL APPLICABILITY

In the present disclosure, the current operating parameters of the air conditioner and the environment information of the surrounding environment of the air conditioner are acquired; the current operating parameters and the environment information are input into the trained neural network model, to obtain the amount of the remaining refrigerant output from the neural network model; and it is determined whether there is a refrigerant leak in the air conditioner according to the amount of the remaining refrigerant, thereby solving the problem of inaccurate determination of whether there is a refrigerant leak in the air conditioner based on artificial experience, and then achieving the effect of improving the accuracy of detecting the refrigerant leak in the air conditioner by means of the artificial neural network algorithm.

What is claimed is:

1. A refrigerant leak detection method for an air conditioner, comprising:
acquiring current operating parameters of the air conditioner and environment information of a surrounding environment of the air conditioner;
acquiring operating parameters and environment information of each type of air conditioner in a case of a refrigerant leak;
performing a normalization processing on the operating parameters and the environment information of each type of air conditioner in the case of the refrigerant leak, to obtain normalized parameters, wherein the normalization processing comprises a linear processing;

performing a transformation processing on the normalized parameters to obtain transformed data, wherein the transformation processing comprises a non-linear processing;

training a neural network model according to the transformed data of the operating parameters and the environment information of each type of air conditioner in the case of the refrigerant leak, to obtain a trained neural network model; wherein inputs of the trained neural network model are the operating parameters and the environmental information of the air conditioner in the case of the refrigerant leak, and an output of the trained neural network model is the amount of the remaining refrigerant;

inputting the current operating parameters and the environment information into the trained neural network model, to obtain an amount of remaining refrigerant output from the trained neural network model; and determining whether there is a refrigerant leak in the air conditioner according to the amount of the remaining refrigerant.

2. The method according to claim 1, wherein, after the performing the transformation processing on the normalized parameters to obtain the transformed data, the method further comprises:

categorizing the transformed data to obtain data of multiple categories;

extracting some data respectively from the data of multiple categories at a preset interval to serve as training sample data, wherein the preset interval comprises a preset time interval or a preset number interval; and training the neural network model by the training sample data, to obtain the trained neural network model.

3. The method according to claim 2, wherein, after the training the neural network model by the training sample data to obtain the trained neural network model, the method further comprises:

inputting testing data into the trained neural network model to obtain an output result of the trained neural network model;

determining whether an error between the output result and a tested result corresponding to the testing data is less than a target error;

if the error between the output result and the tested result corresponding to the testing data is greater than or equal to the target error, adjusting parameters of the neural network model through updating weights and offsets of the neural network model, till the error between the output result and the tested result corresponding to the testing data is less than the target error.

4. The method according to claim 1, wherein, the acquiring the operating parameters and the environment information of each type of air conditioner in the case of the refrigerant leak comprises:

receiving reported operating parameters and the environment information of each type of air conditioner in the case of the refrigerant leak; and acquiring, by Internet of Things, the operating parameters and the environment information of each type of air conditioner in the case of the refrigerant leak when the air conditioner is actually used by a user.

5. The method according to claim 1, wherein, the determining whether there is a refrigerant leak in the air conditioner according to the amount of the remaining refrigerant comprises:

acquiring an amount of original refrigerant of the air conditioner;

determining whether the amount of the remaining refrigerant is less than the amount of the original refrigerant;

if the amount of the remaining refrigerant is less than the amount of the original refrigerant, determining that there is a refrigerant leak in the air conditioner.

6. The method according to claim 1, wherein, the neural network model comprises any one of following models:
a BP neural network model,
a Convolutional Neural Network (CNN) model, and
a residual neural network model;

after it is determined that there is a refrigerant leak in the air conditioner according to the amount of the remaining refrigerant, a warning is issued by a preset manner.

7. A storage medium, comprising programs stored thereon, wherein, the programs, when executed, control a device having the storage medium to perform the refrigerant leak detection method for the air conditioner in claim 1.

8. A processor, configured to execute programs, wherein, the programs, when executed, perform the refrigerant leak detection method for the air conditioner in claim 1.

9. The method according to claim 1, wherein, the acquiring the operating parameters and the environment information of each type of air conditioner in the case of the refrigerant leak comprises:

receiving reported operating parameters and the environment information of each type of air conditioner in the case of the refrigerant leak; or acquiring, by Internet of Things, the operating parameters and the environment information of each type of air conditioner in the case of the refrigerant leak when the air conditioner is actually used by a user.

10. The method according to claim 1, wherein, the inputs of the neural network model comprise indoor and outdoor environment temperatures, an outdoor condenser temperature, outdoor humidity, an operating speed of a compressor of the air conditioner, and operating time of the compressor.

* * * * *